F. H. HUNICKE.
PROCESS OF EXTRACTING RUBBER LIKE GUM FROM ITS VEGETABLE SOURCES.
APPLICATION FILED APR. 6, 1906. RENEWED JAN. 15, 1909.
931,120. Patented Aug. 17, 1909.
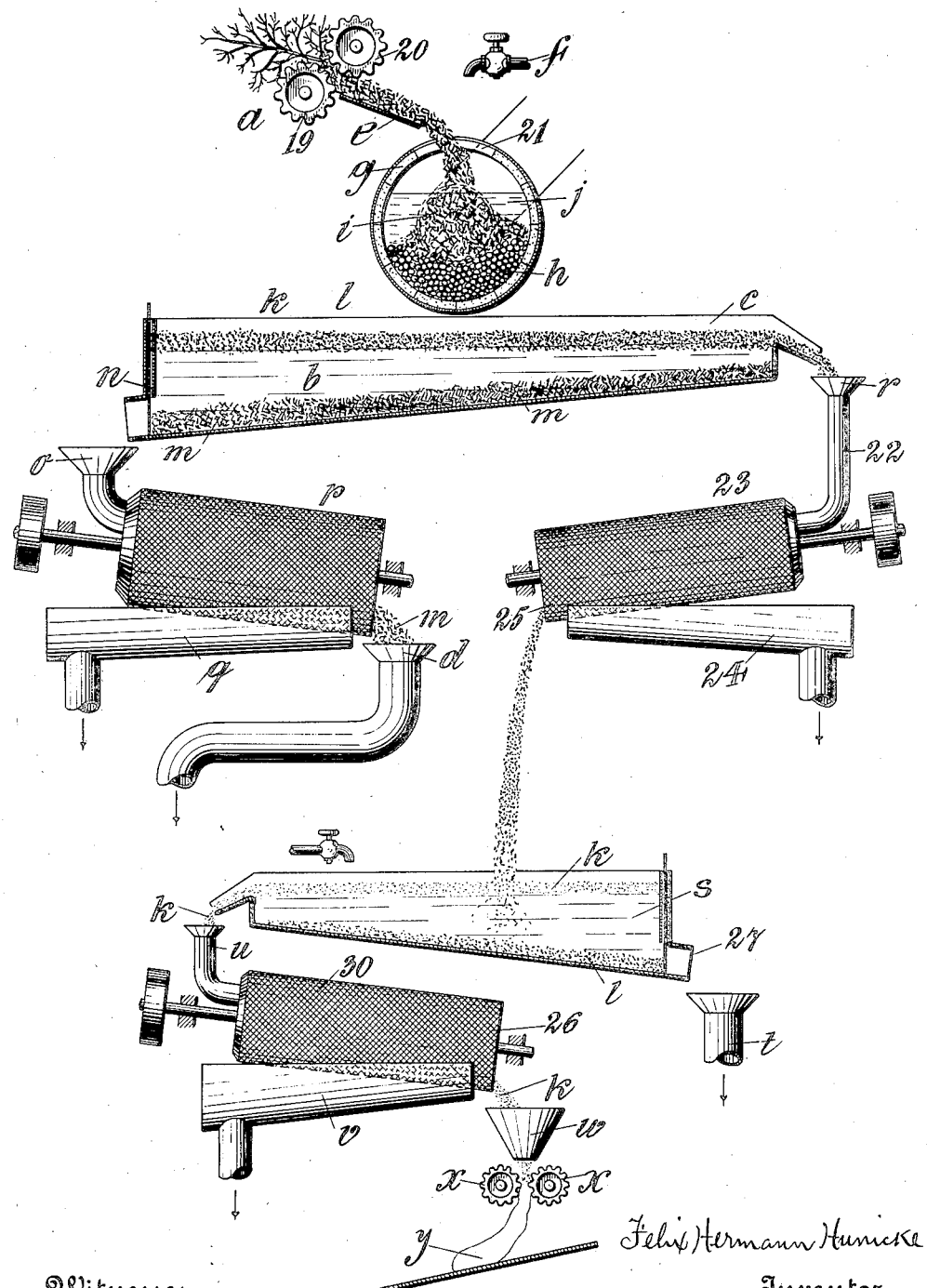

UNITED STATES PATENT OFFICE.

FELIX HERMANN HUNICKE, OF ROSELLE, NEW JERSEY, ASSIGNOR TO CONTINENTAL RUBBER COMPANY, A CORPORATION OF NEW JERSEY.

PROCESS OF EXTRACTING RUBBER-LIKE GUM FROM ITS VEGETABLE SOURCES.

No. 931,120.  Specification of Letters Patent.  Patented Aug. 17, 1909.

Application filed April 6, 1906, Serial No. 310,241. Renewed January 15, 1909. Serial No. 472,558.

*To all whom it may concern:*

Be it known that I, FELIX HERMANN HUNICKE, a citizen of the United States, and a resident of Roselle, in the county of Union, State of New Jersey, have made certain new and useful Improvements in the Processes of Extracting Rubber-Like Gum from Its Vegetable Sources, of which the following is a specification.

This invention relates to the separation or extraction of gum or sap of a rubber-like nature from plants and shrubs or other similar original vegetable sources. I have discovered that when such a plant or shrub is more or less finely divided and disintegrated and thrown into water, the bark and the rubber gum will immediately float, while the wood fiber will almost immediately sink and that after a time interval, more or less extended, during which the bark is subjected to the action of water, the bark becomes waterlogged and sinks, while the rubber floats; this enables me to economically and advantageously separate the gum from its vegetable source employing water in its natural state or condition, and at the natural temperature of the atmosphere where the operation is performed—that is to say, I may employ water which has neither been heated nor had its density or gravity changed or varied.

The object of my invention is to reduce the cost of production of the rubber-like gum and to improve the quality and purity of the gum so produced.

My improved process consists in,—1st: crushing, dividing or triturating the plant, shrub, or vegetable source. 2nd: subjecting the divided shrub or plant to the action of a body of water until the woody fiber separates itself from the gum and bark. 3rd: further subjecting the gum and bark to the action of water until the bark becomes water-logged and sinks or separates from the rubber, and 4th: removing and consolidating the particles of rubber-like gum.

The accompanying drawing illustrates diagrammatically a suitable arrangement of apparatus for practicing my improved process.

The shrubs or plants are placed in a crushing-machine $a$, which may be of any suitable construction, preferably having rollers, 19 20; the crushed material slides or moves down an inclined plane or flooring $e$, through an aperture 21 into a pebble mill, like $g$. This mill is preferably a cylinder containing a supply of pebbles $h$, which, as the cylinder is rotated, grind, bruise, comminute and agglomerate the raw material in the presence of water $j$ in the mill.

$i$ indicates the material operated upon in its passage through the mill, partially separating the rubber-gum, the bark and the wood, which are well ground and divided into particles, the rubber being more or less agglomerated. The ground materials $i$, mixed with water, run into a tank $c$ containing water $b$. The particles of wood $m$ from the disintegrated plants quickly settle to the bottom of the tank and are removed through the gate $n$, or in any other convenient manner, as may be desired. If the bottom of this tank is inclined, as shown in the drawing, these wood particles gravitate toward the gate where they may be removed. When the wood particles $m$ are removed, as described, they are allowed to fall into a hopper $o$, and by means of a connecting pipe, pass into a movable sifter $p$, which when motion is applied causes the water to drain off into the basin $q$, and allows the partially dried wood $m$ to pass into a hopper or other receptacle $d$ and thence to a machine or suitable device for pressing the wood into blocks, in any common and well known manner, to render the wood useful as a fuel, or for the supply of energy to be used in the operation of the illustrated apparatus. In the water $b$ in the tank $c$, the intermingled rubber gum $k$ and bark $l$ float on the surface and may be drawn off or removed together preparatory to continuing the process. The arrangement of the tank here indicated permits the bark and rubber to float toward the right hand side of the tank in the direction of the hopper $r$ which is connected to a pipe 22 that conducts the mixed bark and rubber to a movable sieve 23 located above a basin 24, where the water drains off while the rubber and bark pass through the open end 25 of the sieve. The bark and rubber pass from sieve 23 into fresh water contained in settling tank $s$; these tanks are of considerable extent and there should be a series of them to furnish the desired capacity. These tanks should be large in size but otherwise similar in construction and arrangement to the tank c. At the beginning the bark and rubber float on the surface of the water in the tanks s, but after a somewhat extended immersion, say, forty-eight hours, they separate, the bark l changes its gravity and sinks to the bottom, while the rubber k remains on or near the surface of the liquid. The change in gravity of the bark l is hastened and the sinking of the bark is therefore facilitated by gently stirring; this may be done by an attendant employing a stick or rake, in a well known manner. When the rubber has been thus separated from the bark, it is removed from the tanks s by any suitable tool or appropriate means. In the arrangement of apparatus referred to in this description, the removal is accomplished by directing more water into the tanks s which causes the rubber k to float out at the left hand end of the tank into a hopper connected with the pipe u. This pipe conducts the rubber gum to a movable sieve 30 located above a basin v which carries off the water, the rubber gum being discharged through the open end 26 of the sieve into a hopper w. There are rollers x under the hopper w, which press the rubber gum into a homogeneous form, such as sheets or masses y. The pieces of bark l which settle in the tanks s are taken out and utilized in any desired manner, for instance, a gate 27 may be employed, which when raised permits the bark l to drop or be flushed into the hopper t, which leads into a device for converting or pressing the bark into blocks in any suitable and well known manner, whence it can be utilized as fuel.

The devices described by me in illustrating my invention are not necessary for practicing my process, and it is evident that any suitable form or arrangement of apparatus may be used.

The vegetable source containing the bark and rubber after passing through a mechanical, initial separation step as described, may be submitted to the long continued action of a large body of water, whether the woody fibers and other heavy impurities have been previously separated out or not, although I prefer to submit the crushed or macerated pulp for a short time to the action of a large body of water, whereby the wood and other heavy impurities are allowed to sink and then submit what continues to float to the subsequent long continued action of a large body of water whereby the bark becomes comparatively heavy and sinks.

The "vegetable source of rubber-like gum" referred to in this specification is understood to include all such species of plants, shrubs or other vegetation, especially those growing in the equatorial regions as contain more or less rubber sap or similar substances, or gums, as well as such substances as may be used for similar purposes; and that the term "mechanical separation" or "mechanically initiating the separating process" is understood to include any such mode of crushing, pounding, bruising or dividing as is adapted to the structure of the plant and as will freely expose the gum or similar substance to the subsequent steps of the process.

What I claim and desire to secure by Letters-Patent is:

1. The herein described process of separating rubber-like gum from its vegetable source consisting in mechanically dividing the vegetable source, immersing said source in fresh water, at normal temperature, until the woody fiber becomes waterlogged and sinks, then separating out the floating gum and bark and then immersing the gum and bark in fresh water, at normal temperature, until the bark becomes waterlogged and sinks.

2. The herein described process of separating rubber like gum from its vegetable source, consisting in mechanically dividing the vegetable source, immersing said source in fresh water, at normal temperature, until the woody fiber becomes waterlogged and sinks then separating the sunken and floating portion of said source and then immersing said floating portion in fresh water, at normal temperature, until the bark becomes waterlogged and sinks.

3. The herein described process of separating rubber-like gum from its vegetable source consisting in mechanically dividing the vegetable source, immersing said source in fresh water, at normal temperature, until the woody fiber becomes waterlogged and sinks, then separating the sunken and floating portion of said source, immersing said floating portions in fresh water, at normal temperature, until the bark becomes waterlogged and sinks, then removing and consolidating the floating portion.

4. The herein described process of separating rubber-like gum from its vegetable source consisting in mechanically dividing the vegetable source, immersing said source in fresh water, at normal temperature, until the woody fiber becomes waterlogged and sinks; then continuing the immersion of the floating portions in fresh water, at normal temperature, until the bark becomes waterlogged and sinks and then removing and consolidating the floating portion.

5. The herein described process of separating rubber-like gum from its vegetable source consisting in mechanically dividing the vegetable source, immersing said source in fresh water, at normal temperature, until the woody fiber becomes waterlogged and sinks; then separating the sunken and floating portion of said source, immersing said floating portions in a large body of fresh water at normal temperature for an extended period, or until the bark becomes waterlogged and sinks, then removing and consolidating the floating portions.

FELIX HERMANN HUNICKE.

Witnesses:
JOHN J. EVERS,
JULIAN A. WHITCOMB.